(12) United States Patent
Ehmann et al.

(10) Patent No.: US 7,806,374 B1
(45) Date of Patent: Oct. 5, 2010

(54) CABLE GROMMET

(76) Inventors: Bruno Ehmann, Nelkenstrasse 12, 73563 Mögglingen (DE); Detlev Bethke, Lange Strasse 44, 74405 Gaildorf (DE)

( * ) Notice: Subject to any disclaimer, the term of this patent is extended or adjusted under 35 U.S.C. 154(b) by 1113 days.

(21) Appl. No.: 10/149,090

(22) PCT Filed: Nov. 27, 2000

(86) PCT No.: PCT/EP00/11809

§ 371 (c)(1), (2), (4) Date: Aug. 13, 2002

(87) PCT Pub. No.: WO01/42046

PCT Pub. Date: Jun. 14, 2001

(30) Foreign Application Priority Data

Dec. 8, 1999 (DE) .................... 199 59 185

(51) Int. Cl.
*F16L 3/10* (2006.01)
(52) U.S. Cl. ............... 248/67.5; 248/74.4; 174/40 R; 174/64
(58) Field of Classification Search ........... 248/74.4, 248/68.1, 65, 61, 316.6; 285/137.1; 174/40 R, 174/64, 152 G, 153 G
See application file for complete search history.

(56) References Cited

U.S. PATENT DOCUMENTS

| | | | | | |
|---|---|---|---|---|---|
| 2,354,919 | A | * | 8/1944 | Lockwood | 248/68.1 |
| 2,417,260 | A | * | 3/1947 | Morehouse | 174/135 |
| 3,397,431 | A | * | 8/1968 | Walker | 403/344 |
| 3,414,220 | A | * | 12/1968 | Walker | 248/68.1 |
| 3,695,563 | A | * | 10/1972 | Evans | 248/56 |
| 3,742,119 | A | | 6/1973 | Newman | 174/65 R |
| 4,199,070 | A | * | 4/1980 | Magnussen, Jr. | 211/60.1 |
| 5,098,047 | A | * | 3/1992 | Plumley | 248/68.1 |
| 5,205,520 | A | * | 4/1993 | Walker | 248/74.1 |
| 5,707,169 | A | * | 1/1998 | Schweighofer et al. | 403/391 |
| 5,992,802 | A | * | 11/1999 | Campbell | 248/68.1 |
| 5,996,945 | A | * | 12/1999 | Coles et al. | 248/68.1 |
| 6,002,088 | A | * | 12/1999 | Ehmann | 174/65 G |

FOREIGN PATENT DOCUMENTS

| | | |
|---|---|---|
| DE | 40 20 180 | 7/1991 |
| DE | 4434202 A1 * | 9/1995 |
| DE | 4441478 A1 * | 5/1996 |
| DE | 19547214 A1 * | 2/1997 |
| DE | 197 21 659 | 11/1998 |
| DE | 19852133 A1 * | 5/2000 |
| EP | 0778436 A1 * | 6/1997 |
| EP | 0794354 A1 * | 9/1997 |
| WO | WO 99/06747 | 2/1999 |

OTHER PUBLICATIONS

Merriam-Webster's Collegiate Dictionary, 10th Ediition (1999), pp. 467 and 440.*
Translation of Funk et al. WO99/06747 translated by Schreiber Translations, Inc, (Apr. 2007), pp. 1-20.*
Translation of Funk et al. DE 4434202 translated by Mcelroy Translation Company, (Apr. 2007), pp. 1-7.*

* cited by examiner

*Primary Examiner* — Kimberly T Wood
(74) *Attorney, Agent, or Firm* — Baker & Daniels LLP

(57) ABSTRACT

The invention relates to a cable grommet that consists of two parts that can be intimately joined. The inventive cable grommet has at least one continuous passage in which at least one single-piece strain relief is disposed which is mounted in a base body of high component density.

15 Claims, 6 Drawing Sheets

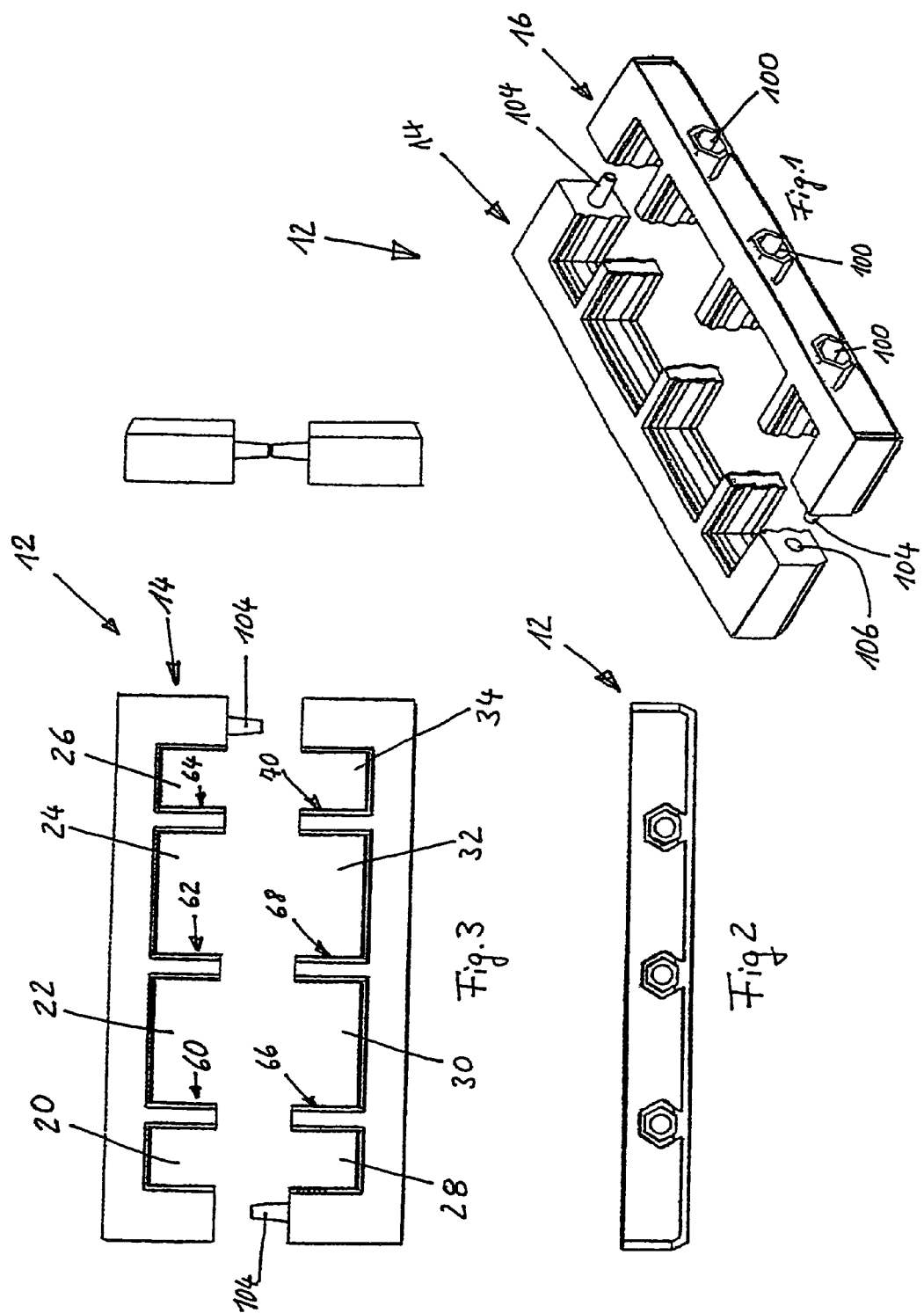

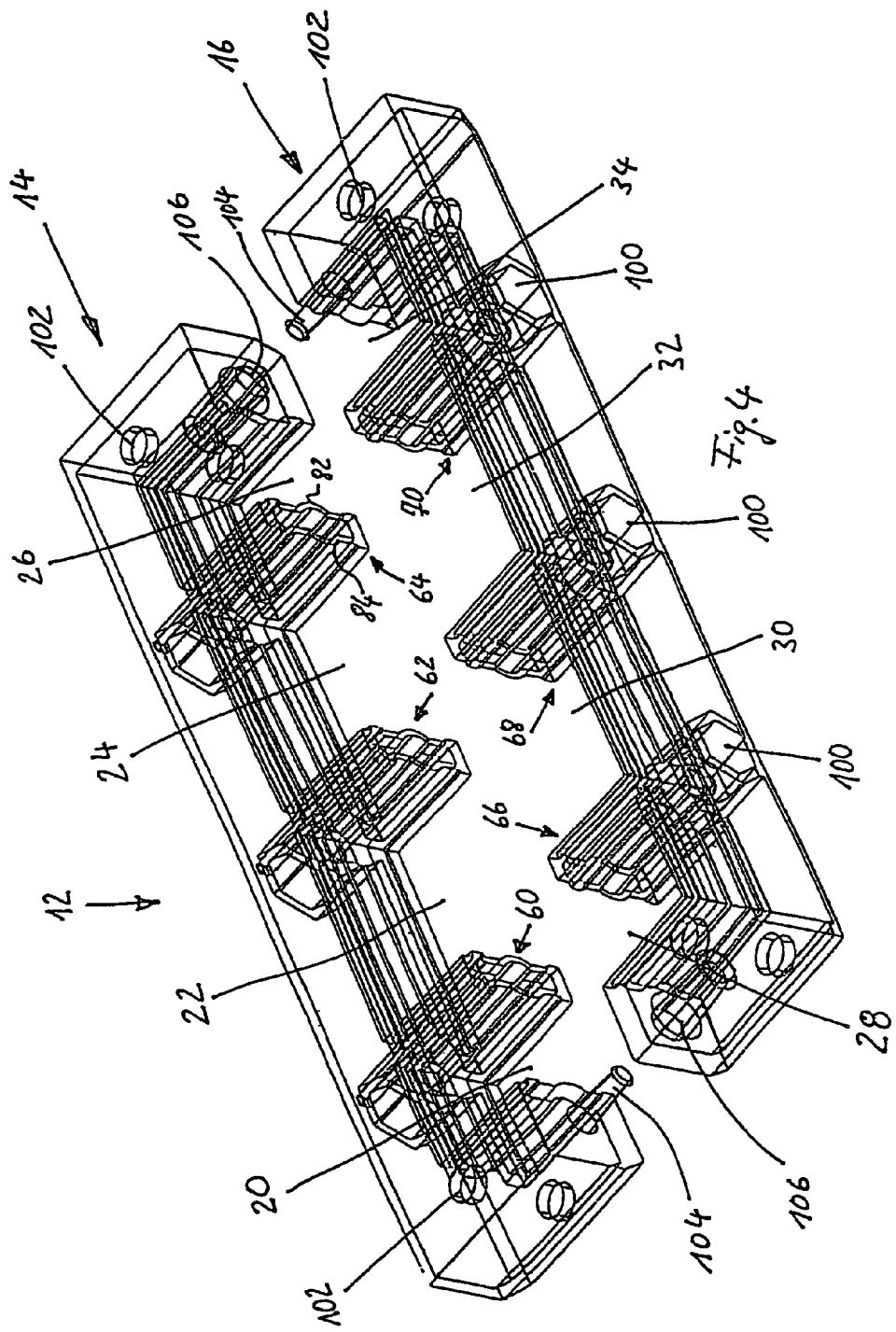

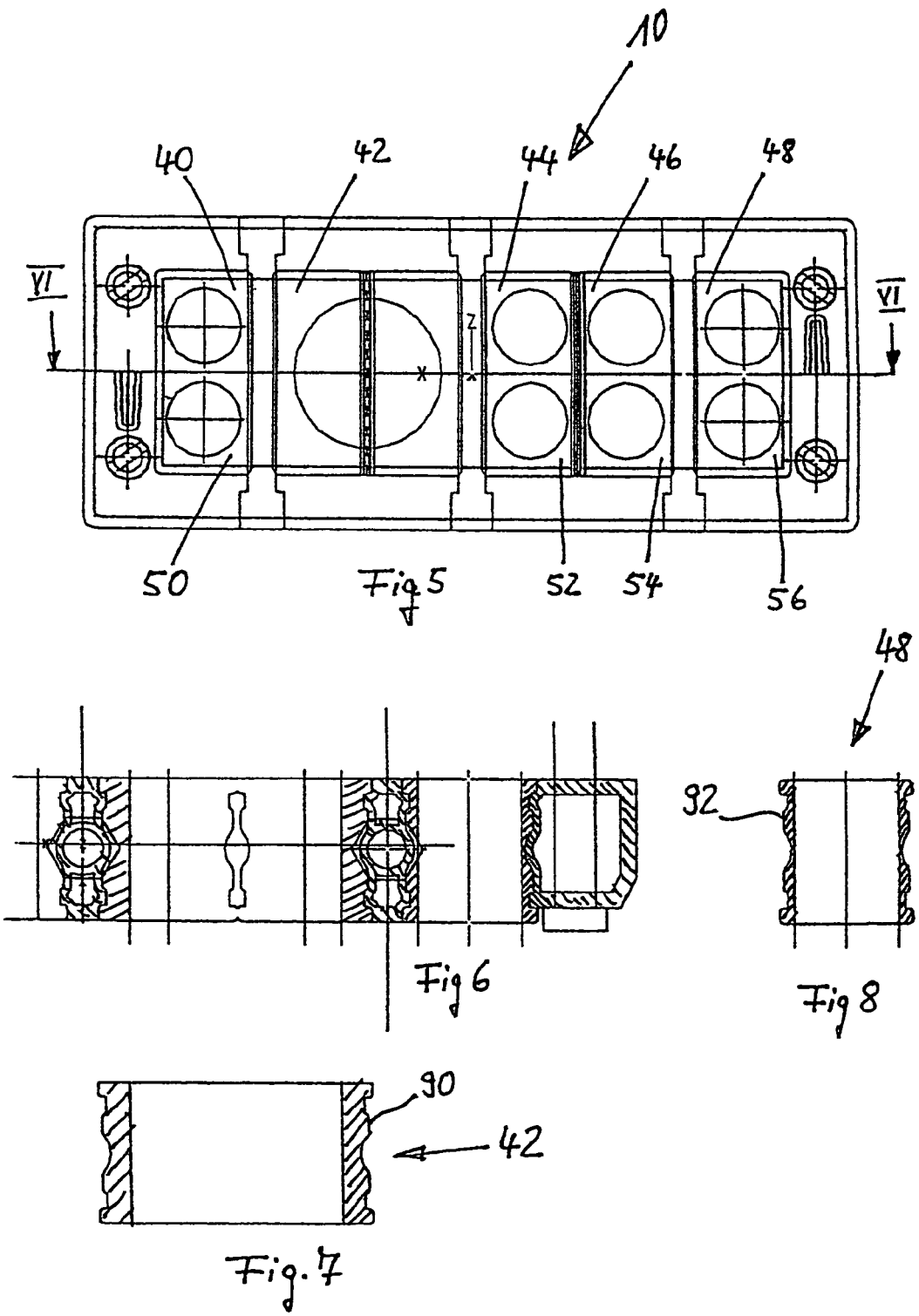

Figure 14:
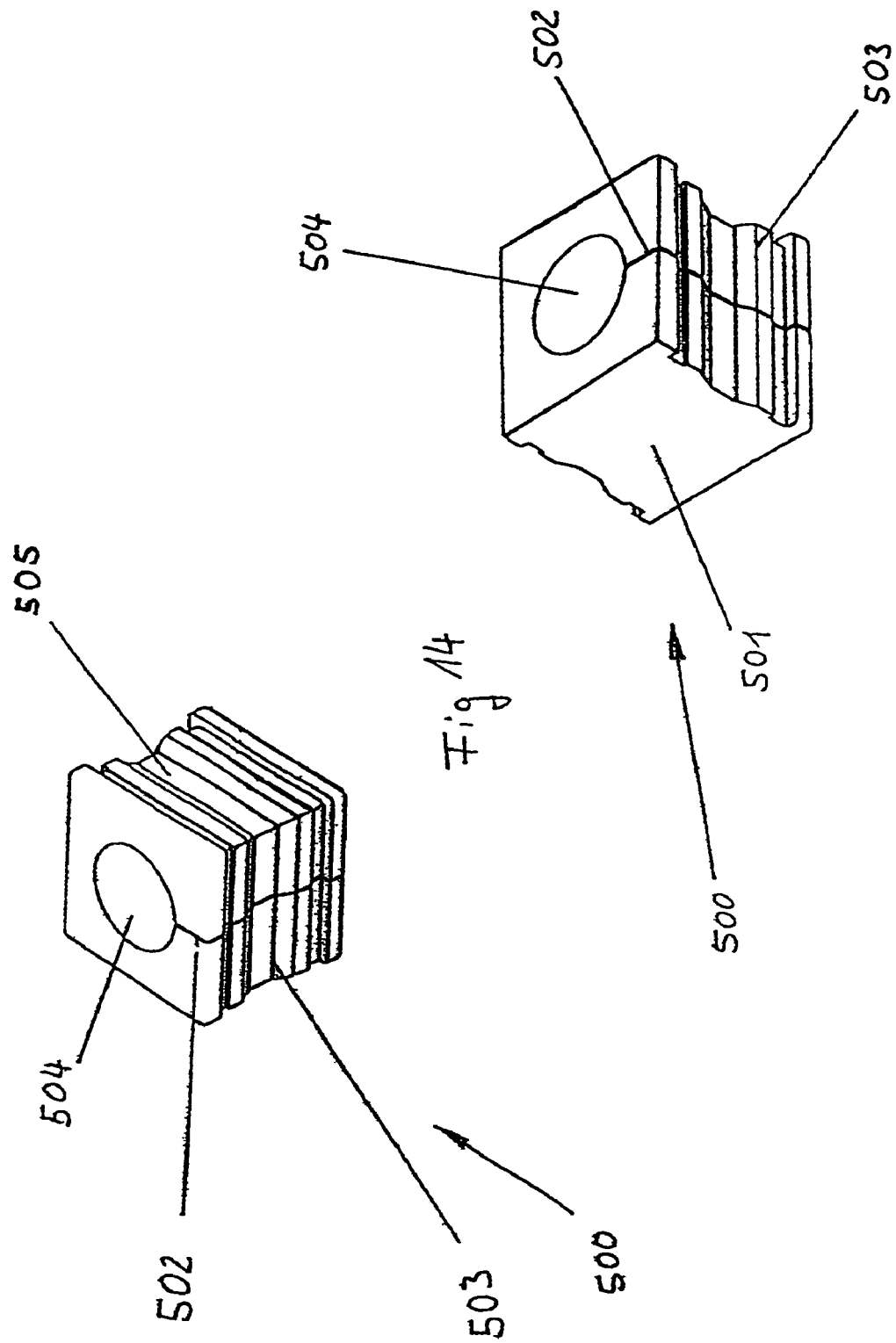

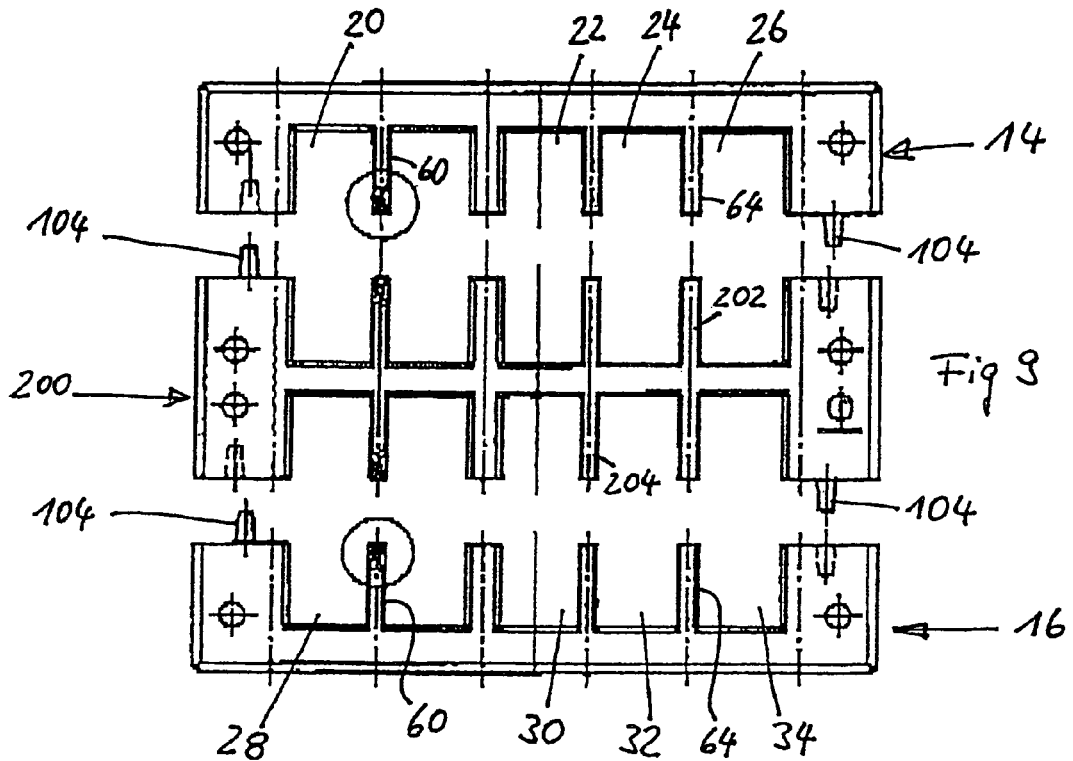
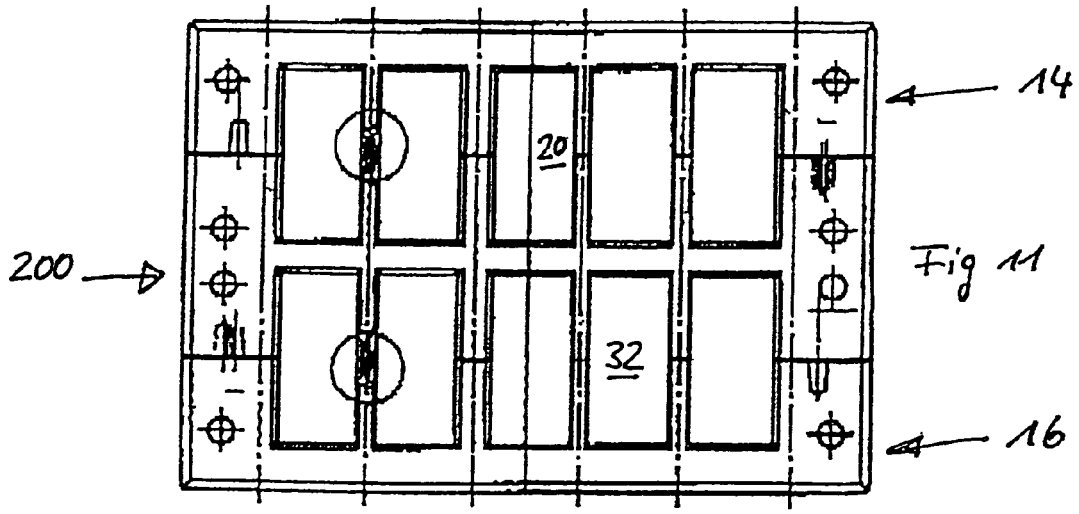

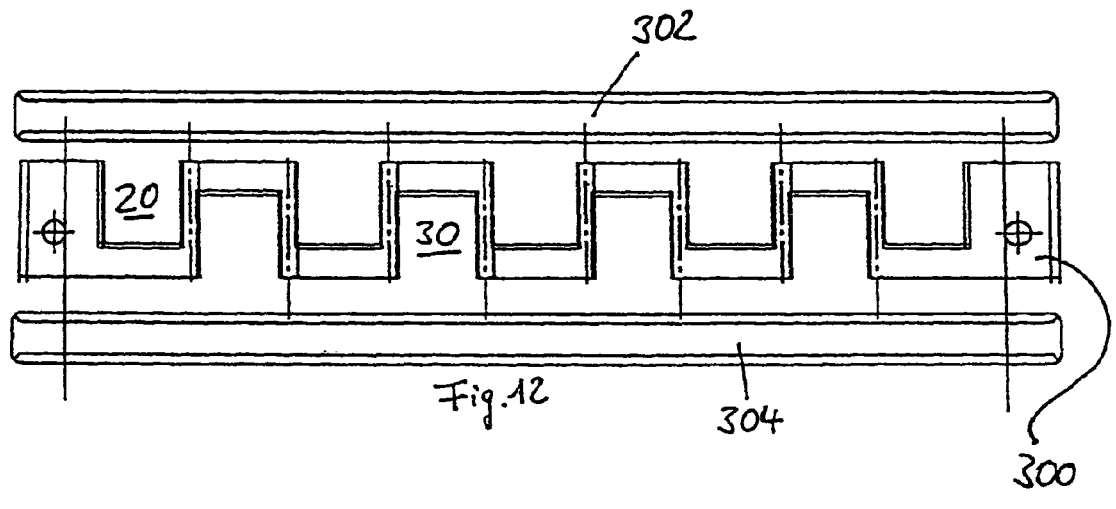
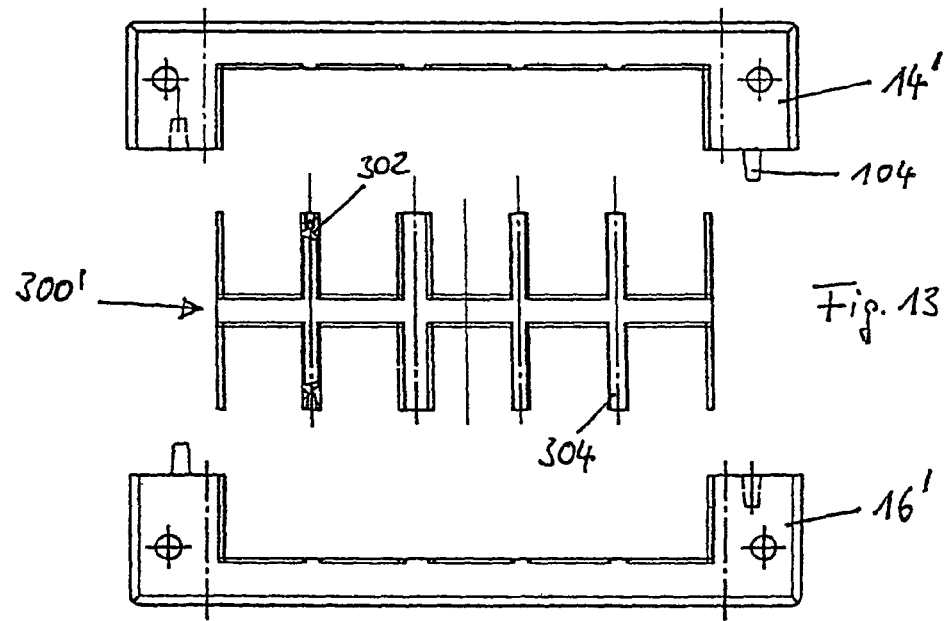

CABLE GROMMET

Cable grommets, which may be solidly connected to an opening, through which the cable is to be led, are known and have been described previously, for example in DE 197 21 659. However, it is difficult to use such cable grommets in assembly, because the insertion of grommets containing cables or wires into connectors is difficult. The grommets are firmly attached to the connectors only after full insertion, otherwise they may easily slip off the connectors. This is a serious disadvantage during assembly.

Thus, the invention has the objective of producing a cable grommet that may be used and inserted without problems and that can house a variety of cables.

This objective is achieved by claim 1.

The invention has the following advantages:
a. Simplified production of the units;
b. Secure support of the strain relief clamps in and between units, even if the units are not yet firmly attached to each other;
c. Secure attachment, because the single strain relief clamps may be inserted into the units without problems, securely and such that they cannot fall out;
d. Particularly simple handling, even if the cable grommet is intended to house many cables with varying diameters.

Other advantages of the invention are listed in the dependent claims.

The dependent claims show an example of an embodiment of the invention.

The drawings show an example of an embodiment of the invention in schematic form, as explained below.

The drawings show:

FIG. 1 A cable grommet in a perspective view
FIG. 2 A vertical view of the cable grommet of FIG. 1
FIG. 3 The cable grommet of FIG. 1 in a frontal view
FIG. 4 A variant of the cable grommet of FIG. 1
FIG. 5 A cable grommet in a frontal view
FIG. 6 A cross section along the line VI-VI of FIG. 5
FIG. 7 A strain relief clamp
FIG. 8 Another strain relief clamp
FIG. 9 Another cable grommet with a middle piece in an exploded view
FIG. 10 The cable grommet of FIG. 9 in a vertical view
FIG. 11 The cable grommet of FIG. 9 as assembled
FIG. 12 Another embodiment of the cable grommet
FIG. 13 Another embodiment of the cable grommet, and
FIG. 14 A strain relief clamp in two views The drawings show a cable grommet 10, which consists of a frame 12 with two wings 14 and 16. Wings 14 and 16 may either be connected solidly (operation position) or be disconnected (loose position). The frame has several openings or indentations 20 to 34. These openings 20 to 34 contain single strain relief clamps 40 to 56 (see FIG. 5), by which the cables or wires (not shown here) can be solidly and securely connected to frame 12. During operation, all components of cable grommet 10 are solidly connected. When disassembled, wings 14 and 16 are solidly connected to strain relief clamps 40 to 56. Strain relief clamps 40 to 56 are securely attached within frame 12. Frame 12 is designed such that any two openings are separated by a separator 60 to 70. The respective openings 20 to 34 are in each case completely contained within either wing 14 or 16. The drawings show that wings 14 and 16 have protuberances 80, 82 or indentations 84, which form a friction lock with the exterior wall 90, 92 of strain relief clamps 42, 48. Wings 14 and 16 have a comb-like shape, and strain relief clamps 40 to 56 have an essentially rectangular parallelepiped or cube exterior.

In general, it is also possible that one wing has a comb-like shape, while the other wing has the form of a bar.

Each of the wings has a protuberance 104, which can be inserted into a suitable indentation 106 of the opposite wing to guarantee a defined connection of the two wings. The solid connection of the wings 14 and 16 will be achieved by means of screws to be inserted in openings 100.

Production is handled as follows:

Hollow strain relief clamps are attached to the cables or wires, where the clamps generally are made of rubber or elastic plastic and where they have a slit in the longitudinal direction, such that they may be attached to the wire sideways. The strain relief clamps are then inserted into the opening of the wings, where they will be attached immovably and without danger of loss. Wings with clamps in place are then connected to each other. This modular assembly has the advantage that a variety of cables/wires may be included to optimally use the available space between the wings.

FIGS. 9, 10, and 11 show a cable grommet. It is significant here that a middle piece 200 is situated between wings 14, 16. Its separators 202, 204 match the separators 60, 64 of wings 14, 16, as is shown most clearly in FIG. 11. This forms two rows of openings 20, 32. It is also possible to join several such middle pieces 200, such that three, four or more rows of openings are formed. In practical applications, this will depend on the diameter of the cable and the size of the respective strain relief clamps.

FIG. 12 shows a middle piece 300 with serpentines. Openings 20, 30 are covered by bars 302, 304. The strain relief clamps are included in openings 20, 30 such as to be kept in place securely (tight fit and friction-locked). This is one of the simplest embodiments of the invention. FIG. 13 shows a cable grommet similar to that of FIG. 9; however, wings 14', 16' have no separators. The only separators 302, 304 are in middle piece 300. The ends of separators 302, 304 touch the inside of wings 14', 16'.

FIG. 14 shows a strain relief clamp 500 with a slit 502. Strain relief clamp 500 is a cube or rectangular parallelepiped with an opening 504. The diameter of opening 504 is fitted to match the diameter of the cable. If the cable grommet contains cables with strain relief clamps, then the wires are held by the cable grommet.

Strain relief clamp 500 has a flat and level top surface 501 and side surfaces 503, 505 with grooves. Strain relief clamp 500 is inserted into wings 14, 16 in the direction of the arrow. Side surfaces 503, 505 are tightly connected to separators 60 to 70, such that strain relief clamp 500 cannot move in the direction of the cable. Side surfaces 503, 505 fit tightly against separators 60 to 70 and form a friction lock. The level surface 501 extends to the level of the free ends of separators 60 to 70, but it may also extend a small distance above wings 14, 16. The connection of two wings 14, 16 with a row of strain relief clamps will then lead to tight contact of these level surfaces 501. This generates a tight connection between the rows. The surface 501 may also have a different shape. It is important that the assembly can make a secure contact.

The most significant characteristics of the invention include the following:

1. The items 14, 16; 200, 300, 302, 304; 14', 16', 300' each consist of hard material (plastic) and serve to secure and hold the strain relief clamps 40-56 made of elastic plastic or rubber.
2. Strain relief clamps 40-56 have slots 504 for the cable or wire, have a slit to insert the cable into the slot and normally have the shape of a cube or rectangular parallelepiped; however, they may also have a triangular or oval footprint.
3. Surfaces of strain relief clamps 40-56, which contact the wings, have such surfaces that they can form a tight fit and friction locks with the wings. Normally this involves grooves or springs. The strain relief clamps are normally inserted by pushing them into the cable grommet, rather like pushing in a drawer, so that the strain relief clamps cannot fall out of the unit, even prior to final assembly. Thus, the user can move the unit about, without having to fear that the strain relief clamps will fall out.

4. The slits 502 of strain relief clamp 500 are constructed such that they will be closed during assembly of the cable grommet, tightly surrounding the inserted cable. The strain relief clamps are solid and immovable even within the cable grommet.

5. If the cable grommet has two or more rows of strain relief clamps, the rows are pressed tightly against each other. The contact surfaces are smooth or also rough. It is important that neither air nor liquids can flow through this spot. It is also possible to form more rows of strain relief clamps to be situated inside the cable grommet. These rows are then normally parallel to each other. Suitable middle pieces 200, 300' (FIGS. 9, 11, 13) may then also contain two rows consisting of a single wing.

6. If the wings are solidly connected to each other, such as by screws, then the strain relief clamps within the cable grommet are compacted such that the cables in the cable grommet are held firmly and immovably. Such cable grommets are particularly useful for control panels.

7. A strain relief clamp 200 may have two or more slots, each of which can be opened by a separate slit in order to insert a cable.

The invention claimed is:

1. A cable grommet, comprising:
a frame including first and second housing portions connectable to one another, at least one of said first and second housing portions including at least one opening having opposing, substantially straight sides;
at least one flexible strain relief member including a periphery, a cable opening adapted to receive one or more cables, and a slit connecting at least a portion of said periphery with said cable opening whereby one or more cables may be inserted through said slit and into said cable opening;
each said strain relief member insertable into a respective said opening in a friction-fit manner with at least a portion of said periphery of said strain relief member engaging said sides of said opening to retain each said strain relief member within a respective said opening, said second housing member subsequently attachable to said first housing member to capture each said strain relief member therebetween:
whereby because the opposing sides of the opening are straight, they will exert a friction lock on the strain relief member even when the strain relief member is only partially seated in the opening.

2. The cable grommet of claim 1, wherein said sides of each said opening include at least one of projecting portions and recesses, and said periphery of each said strain relief member includes at least one of projecting portions and recesses, said at least one of projecting portions and recesses of each said strain relief member engaging said at least one of projecting portions and recesses of each of said sides of said opening upon insertion of said strain relief member into a respective said opening.

3. The cable grommet of claim 1, wherein at least one of said first and second housing portions includes at least two openings, said openings separated by a separator.

4. The cable grommet of claim 1, wherein each of said first and second housing portions includes a plurality of said openings, said openings separated by separators.

5. The cable grommet of claim 1, wherein said periphery of said strain relief member has one of a rectangular parallelepiped shape, a cube shape, a triangular shape, and an oval shape.

6. The cable grommet of claim 1, wherein upon attachment of said second housing member to said first housing member, said strain relief member is captured between said first and second housing members with a clamping force across said slit.

7. The cable grommet of claim 1, wherein said frame includes a plurality of said openings with a plurality of said strain relief members fitted therein, said openings and said strain relief members arranged in a row.

8. The cable grommet of claim 1, wherein said frame includes a plurality of said openings with a plurality of said strain relief members fitted therein, said openings and said strain relief members arranged in at least two parallel rows with respective said strain relief members in said at least two rows pressed against one another.

9. The cable grommet of claim 8, wherein each said row is disposed within a respective said first and second housing portion of said frame.

10. The cable grommet of claim 1, wherein said first housing portion includes a plurality of said openings, said openings separated by separators, and said second housing portion is formed as a bar.

11. The cable grommet of claim 2, wherein each of said first and second housing portions includes a plurality of said openings, said openings separated by separators.

12. The cable grommet of claim 2, wherein said periphery of said strain relief member has one of a rectangular parallelepiped shape, a cube shape, a triangular shape, and an oval shape.

13. The cable grommet of claim 2, wherein said frame includes a plurality of said openings with a plurality of said strain relief members fitted therein, said openings and said strain relief members arranged in a row.

14. A cable grommet, comprising:
a frame including first and second housing portions connectable to one another, at least one of said first and second housing portions including at least one opening having opposing, substantially parallel, straight sides;
at least one flexible strain relief member including a periphery, a cable opening adapted to receive one or more cables, and a slit connecting at least a portion of said periphery with said cable opening whereby one or more cables may be inserted through said slit and into said cable opening, said strain relief member periphery having a pair of opposite sides that are straight and substantially parallel;
each said strain relief member insertable into a respective said opening in a friction-fit manner with said opposite straight sides thereof engaging said sides of said opening to frictionally retain each said strain relief member within a respective said opening, said second housing member subsequently attachable to said first housing member to capture each said strain relief member therebetween:
whereby because the opposing sides of the opening are straight, they will exert a friction lock on the strain relief member even when the strain relief member is only partially seated in the opening.

15. The cable grommet of claim 14 wherein the strain relief member has a periphery that is one of a rectangular parallelepiped shape and a cube shape.

* * * * *